United States Patent
Mabary

[11] Patent Number: 6,129,167
[45] Date of Patent: Oct. 10, 2000

[54] MOTORCYCLE ACCESSORY

[76] Inventor: Harold L. Mabary, Rte. 2 Box 246, Greenfield, Mo. 65661

[21] Appl. No.: 09/112,029

[22] Filed: Jul. 8, 1998

[51] Int. Cl.[7] .......................... B62D 61/02; B62K 11/00; B62M 7/00

[52] U.S. Cl. ............................................. 180/229; 237/79

[58] Field of Search .................................. 180/219, 229, 180/68.1, 68.4, 68.6; 220/86.2; 296/78.1; 165/98, 129; 237/79

[56] References Cited

U.S. PATENT DOCUMENTS

| | | | |
|---|---|---|---|
| 3,815,700 | 6/1974 | Mittendorf | 180/68 P |
| 3,863,728 | 2/1975 | Mittendorf | 296/91 |
| 4,537,273 | 8/1985 | Funabashi | 180/229 |
| 4,570,740 | 2/1986 | Hara | 180/229 |
| 4,678,223 | 7/1987 | Kishi et al. | 296/78.1 |
| 5,490,574 | 2/1996 | Ishiizumi et al. | 180/68.1 |
| 5,715,904 | 2/1998 | Takahashi et al. | 180/229 |

FOREIGN PATENT DOCUMENTS

| | | | |
|---|---|---|---|
| 3-193584 | 8/1991 | Japan | 180/68.6 |
| 3-243485 | 10/1991 | Japan | 180/68.6 |
| 3-279093 | 12/1991 | Japan . | |
| 3-295782 | 12/1991 | Japan . | |

*Primary Examiner*—Chris Schwartz
*Assistant Examiner*—C J. Bartz
*Attorney, Agent, or Firm*—William R. Sharp

[57] ABSTRACT

The invention is an accessory for a motorcycle of the type having a nonvertical, slanted radiator with a first reservoir, a second reservoir, and a core between the first and second reservoirs, comprising: a cover portion having an upper end, a lower end, an opening between the upper and lower ends, and an outer surface having a lower boundary at the lower end; a projecting portion having an upper surface extending generally outwardly from the lower boundary and sloping upwardly in a generally inward direction; and a means for mounting the cover portion over the radiator so that the cover portion covers the first and second reservoirs and the opening is aligned with the core.

9 Claims, 1 Drawing Sheet

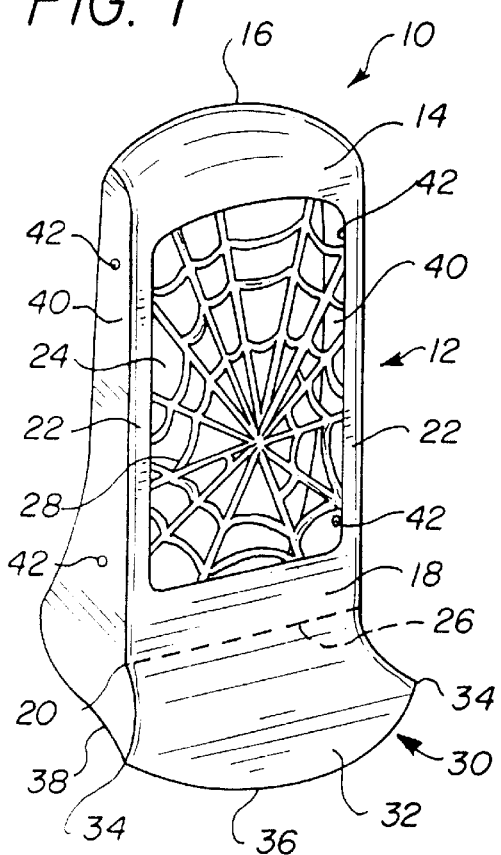
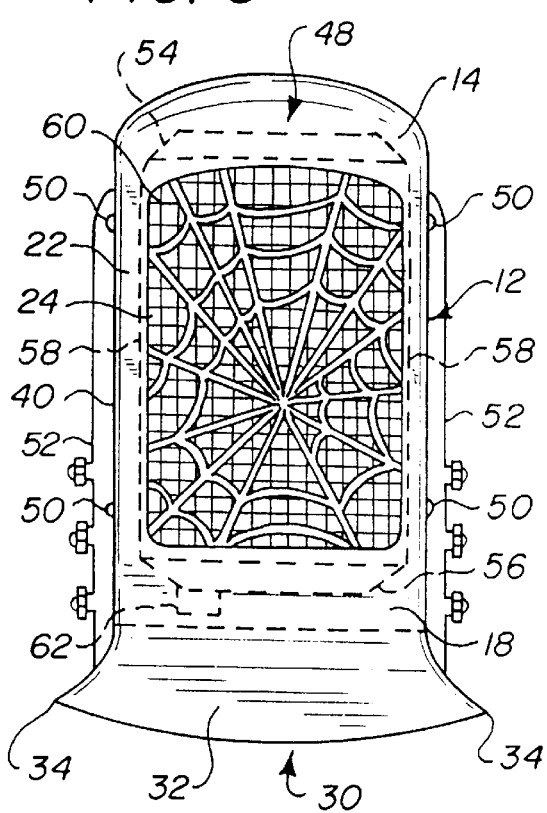
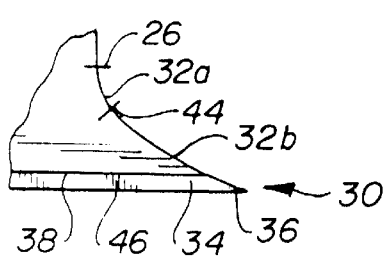
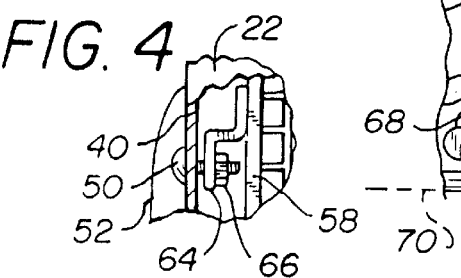
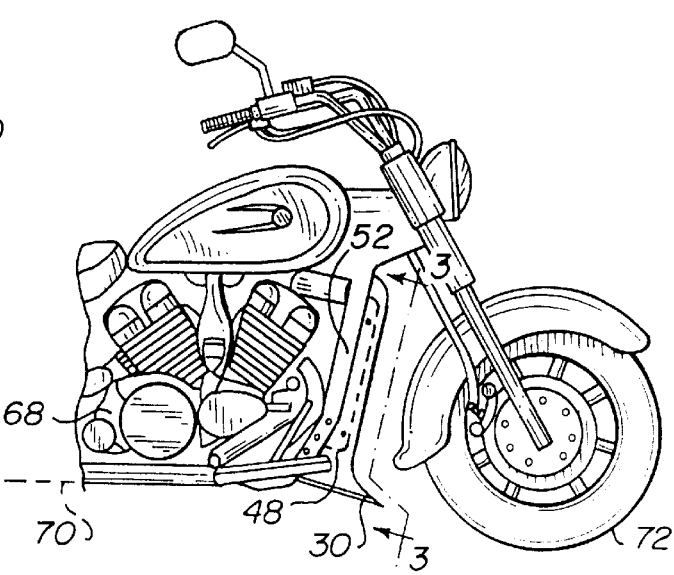

MOTORCYCLE ACCESSORY

BACKGROUND OF THE INVENTION

The invention relates to an accessory for a motorcycle, and more particularly to an accessory to be mounted over a motorcycle radiator.

A motorcycle radiator comprises a pair of reservoirs and a core between the reservoirs. One reservoir receives hot fluid from the engine, and fluid cooled by the core flows from the other reservoir back to the engine. The radiator is commonly mounted in front of the engine in a nonvertical, slanted orientation.

SUMMARY OF THE INVENTION

The invention is an accessory for a motorcycle of the type having a nonvertical, slanted radiator with a first reservoir, a second reservoir, and a core between the first and second reservoirs, comprising: a cover portion having an upper end, a lower end, an opening between the upper and lower ends, and an outer surface having a lower boundary at the lower end; a projecting portion having an upper surface extending generally outwardly from the lower boundary and sloping upwardly in a generally inward direction; and a means for mounting the cover portion over the radiator so that the cover portion covers the first and second reservoirs and the opening is aligned with the core. The accessory has a number of advantages which are discussed in the following detailed description.

BRIEF DESCRIPTION OF THE DRAWINGS

FIG. 1 is a perspective view of a motorcycle accessory in accordance with a preferred embodiment of the invention.

FIG. 2 is a side view of a portion of the accessory of FIG. 1.

FIG. 3 is a frontal view of the accessory as mounted over a motorcycle radiator.

FIG. 4 is an enlarged view of a portion of the mounted accessory of FIG. 3, where portions of the accessory are broken away to reveal certain mounting details.

FIG. 5 is a side view of a front portion of a motorcycle having the accessory mounted over the radiator.

It should be understood that FIGS. 3 and 5 do not show some mechanical details of the motorcycle not pertinent to the invention for the sake of simplicity and clarity of illustration.

DETAILED DESCRIPTION OF THE INVENTION

Referring to FIG. 1, accessory 10 includes a cover portion 12 having an upper wall 14 defining an upper end 16 of the cover portion, a lower wall 18 defining a lower end 20 of the cover portion, side strips 22 extending between upper wall 14 and lower wall 18; an opening 24 defined between upper wall 14 and lower wall 18 and between side strips 22 so as to be between upper end 16 and lower end 20, and an outer surface having an imaginary lower boundary 26 at lower end 20. Opening 24 has an associated grill 28, which is optional.

Accessory 10 further includes a projecting portion 30 having an upper surface 32 extending generally outwardly from lower boundary 26 and sloping, preferably curving, upwardly in a generally inward direction. Such "inward direction" can be considered to be toward the imaginary surface (a plane in the illustrated embodiment) defined by the outer surface of cover portion 12 adjacent to lower boundary 26 and extending beyond the dimensional limits of such portion of the outer surface. Preferably, upper surface 32 of projecting portion 30 flares from an inner width at lower boundary 26 to an outer width greater that the inner width. The outer width in the illustrated embodiment is measured between corners 34, and a curved edge 36 extends between corners 34. Opposing edges 38 (only one of which is visible in FIG. 1) also extend from corners 34.

Accessory 10 also includes opposing sidewalls 40 between which upper wall 14 and lower wall 18 extend. Side strips 22 extend along respective sidewalls 40. Each sidewall 40 has a pair of holes 42 for use in mounting cover portion 12 over a motorcycle radiator in a manner described below.

FIG. 2 shows a side view of projecting portion 30. Upper surface 32 preferably comprises a transitional surface portion 32a, extending from lower boundary 26 to an imaginary transitional boundary 44, and a primary surface portion 32b extending from the transitional boundary. Transitional surface portion 32a preferably has more curvature than primary surface portion 32b in making the transition from the outer surface of the cover portion at lower boundary 26 to primary surface portion 32b at transitional boundary 44. Most preferably, primary surface portion 32b has a substantially constant radius of curvature so as to define a portion of a circular cylinder. The upper edge of a bottom wall 46 is joined to edge 38 and to edge 36. of course, although not visible in FIG. 2, an opposing upper edge of bottom wall 46 is joined to the opposing edge 38. Bottom wall 46 is slightly curved so that the lowermost points of its outer surface are below edges 36 and 38, except for the outermost point of edge 36.

Referring to FIG. 3, this FIGURE shows cover portion 12 mounted over a motorcycle radiator 48 (shown in broken lines) with screws 50 in a manner discussed below with reference to FIG. 4. Radiator 48, which is mounted over opposing frame members 52 of the motorcycle, comprises an upper reservoir 54, a lower reservoir 56, and a pair of sidewalls 58 and a core 60 extending between reservoirs 54 and 56. As shown, upper wall 14 covers upper reservoir 54, lower wall 18 covers lower reservoir 56, and opening 24 is aligned with core 60. Lower wall 18 also covers a regulator 62 (shown in broken lines), which is positioned below lower reservoir 56. FIG. 3 also shows a frontal view of projecting portion 30 and its upper surface 32.

Referring to FIG. 4, in this enlarged view, portions of a sidewall 40 and a side strip 22 are broken away to reveal a sidewall 58 of the radiator and a connector clip 64 affixed at its upper end to sidewall 58. A nut 66 is affixed to the inside surface of the lower end of connector clip 64. The threaded portion of screw 50 extends through a hole 42 (FIG. 1) in sidewall 40 and is threadedly received by nut 66 so as to fixedly but removably connect sidewall 40 to sidewall 58. Of course, it is within the scope of the invention to provide other means for mounting the cover portion of the accessory over the radiator.

Referring to FIG. 5, radiator 48 (shown in broken lines) is shown as mounted over frame members 52 (only one is visible) immediately in front of engine section 68 in a nonvertical, slanted orientation. Referring back to FIG. 1 in conjunction with FIG. 5, it is preferred that the distance between upper end 16 and lower end 20 of cover portion 12 is such that, with the cover portion in its mounted position over radiator 48 as shown in FIG. 5, projecting portion 30 and its upper surface extends below the bottom level 70 of engine section 68.

With regard to materials of construction, the above-described embodiment preferably employs sheet metal, such as mild steel. It is within the scope of the invention, however, to use other materials, such as moldable fiberglass.

Referring to FIGS. 3 and 5, the accessory of the invention has a number of advantages. Since reservoirs 54 and 56 are covered by upper wall 14 and lower wall 18, respectively, damage of the reservoirs by road debris is prevented. Lower wall 18 also protects regulator 62 from damage. Air flowing along upper surface 32 is directed upward and then through opening 24 for improved air circulation through core 60. Air flow under engine section 68 tends to create an upward force which can decrease contact area of front tire 72 with a road surface. This leads to instability and difficulty in steering, especially in undesirable crosswind conditions. This effect is counteracted to a large degree by blocking of some air flow under engine section 68 by projecting portion 30, and by an aerodynamic, generally downward force created by the flow of air into and over upper surface 32. The preferred flared aspect of upper surface 32 optimizes surface area available for impingement by air. This is important because front tire 72 causes disturbance in the flow of air to the central portion of upper surface 32. Projecting portion 30, as extending below bottom level 70 of engine section 68, also helps to keep road debris off of the engine.

Obviously, many modifications and variations of the present invention are possible in light of the above teachings. For example, under broad aspects of the invention, the accessory could be adapted for use with a radiator having a central core and reservoirs on each side of the core. It is, therefore, to be understood that within the scope of the appended claims, the invention may be practiced otherwise than as specifically described.

What is claimed is:

1. An accessory for a motorcycle of the type having a nonvertical, slanted radiator with a first reservoir, a second reservoir, and a core between the first and second reservoirs, comprising:

a cover portion having an upper end, a lower end, a first wall, a second wall, an opening defined between the first and second walls so as to be between the upper and lower ends, and an outer surface having a lower boundary at the lower end;

a projecting portion having an upper surface extending generally outwardly from the lower boundary and sloping upwardly in a generally inward direction; and a means for mounting the cover portion over the motorcycle radiator so that the first and second walls cover the first and second reservoirs, respectively and the opening is aligned with the core, and the projecting portion faces outwardly from the motorcycle radiator with respect to the longitudinal direction of the motorcycle.

2. An accessory as recited in claim 1 wherein the upper surface curves upwardly in said generally inward direction.

3. An accessory as recited in claim 2 wherein the upper surface comprises a transitional surface portion extending from the lower boundary to a transitional boundary and a primary surface portion extending from the transitional boundary, and wherein the transitional surface portion has more curvature than the primary surface portion in making the transition from the outer surface at the lower boundary to the primary surface portion at the transitional boundary.

4. An accessory as recited in claim 3 wherein the primary surface portion has a substantially constant radius of curvature so as to define a portion of a circular cylinder.

5. An accessory as recited in claim 1 wherein the radiator is of the type mounted in front of an engine section of the motorcycle, and wherein the engine section has a bottom level and the distance between the upper end and lower end is such that, with the cover portion in its mounted position over the radiator, the projecting portion and its upper surface extends below the bottom level of the engine section.

6. An accessory as recited in claim 1 wherein the first and second walls define at least a portion of the outer surface, and wherein such outer surface portion and the upper surface of the projecting portion are substantially continuous and unbroken.

7. An accessory for a motorcycle of the type having a nonvertical, slanted radiator with a first reservoir, a second reservoir, and a core between the first and second reservoirs, comprising:

a cover portion having an upper end, a lower end, an opening between the upper and lower ends, and an outer surface having a lower boundary at the lower end;

a projecting portion having an upper surface extending generally outwardly from the lower boundary and sloping upwardly in a generally inward direction, wherein the upper surface flares from an inner width at the lower boundary to an outer width greater than the inner width; and a means for mounting the cover portion over the radiator so that the cover portion covers the first and second reservoirs and the opening is aligned with the core.

8. An accessory for a motorcycle of the type having a nonvertical, slanted radiator with an upper reservoir, a lower reservoir, and a core between the first and second reservoirs, comprising:

a cover portion having an upper wall defining an upper end, a lower wall defining a lower end, an opening defined between the upper and lower walls so as to be between the upper and lower ends, and an outer surface having a lower boundary at the lower end;

a projecting portion having an upper surface extending generally outwardly from the lower boundary and sloping upwardly in a generally inward direction; and a means for mounting the cover portion over the radiator so that the upper and lower walls cover the upper and lower reservoirs, respectively, and the opening is aligned with the core.

9. An accessory as recited in claim 8 wherein the mounting means includes opposing sidewalls between which the upper and lower walls extend.

* * * * *